O. PADDOCK.

Hot Air Furnace.

No. 1,575. Reissued Nov. 24, 1863.

Witnesses:
J. W. Coombs
R. S. Spencer.

Inventor:
Oscar Paddock
per Munn & Co
attorneys.

N. PETERS, Photo-Lithographer, Washington, D. C.

UNITED STATES PATENT OFFICE.

OSCAR PADDOCK, OF WATERTOWN, NEW YORK.

IMPROVEMENT IN HOT-AIR FURNACES.

Specification forming part of Letters Patent No. ——, dated November 27, 1860; Reissue No. 1,575, dated November 24, 1863.

DIVISION B.

*To all whom it may concern:*

Be it known that I, OSCAR PADDOCK, of Watertown, in the county of Jefferson and State of New York, have invented certain new and useful Improvements in Hot-Air Furnaces; and I do hereby declare that the following is a full, clear, and exact description thereof, reference being had to the accompanying drawings, making a part of this specification.

The present invention relates more particularly to a mechanism for operating valves of hot-air furnaces; and it consists in a method of operating valves automatically by opening or closing the furnace-door, at the same time affording the means to operate them by hand, at the pleasure of the attendant; also, in a method of more equally distributing the heat in hot-air furnaces and of more effectually preventing the escape of smoke at the furnace-door.

Figure 1:
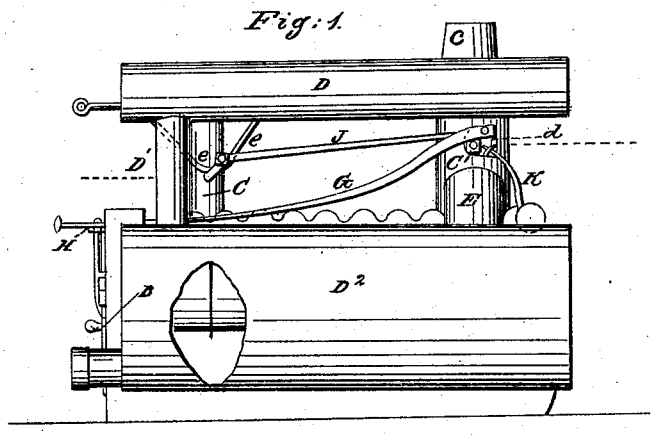
Figure 2:
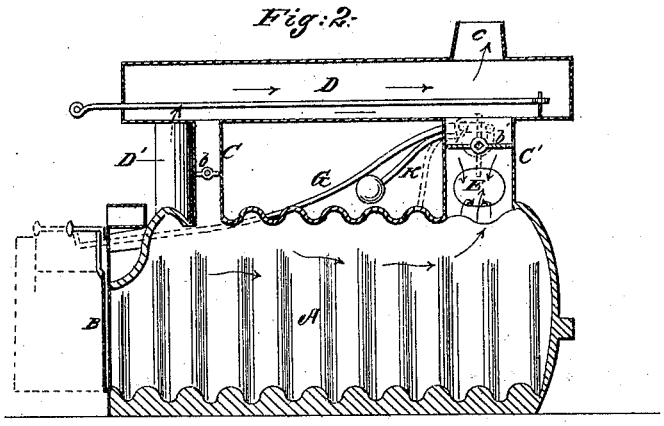
Figure 3:
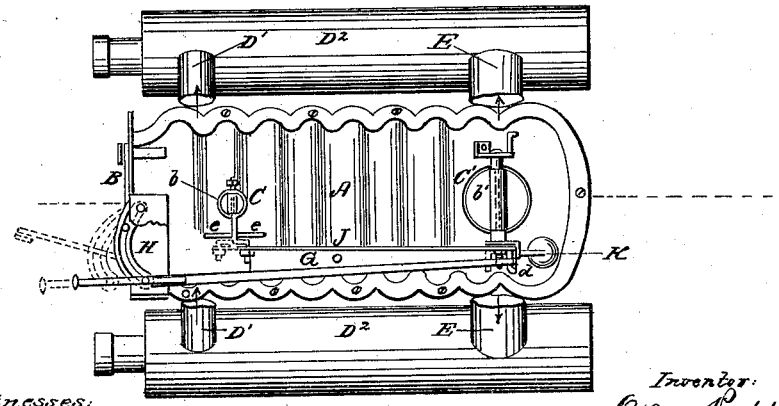

In the accompanying drawings, Figure 1 is a side elevation of a hot-air furnace with the improved valve arrangement applied to it. Fig. 2 represents in vertical section one arrangement of my improved mode of automatically operating valves by the furnace-door. It is here shown applied to the left side of the main pipe. Fig. 3 is a section taken in the horizontal plane indicated by the red lines *x x* in Fig. 1, and showing a valve arrangement also constructed in accordance with my said invention applied to the right-hand side of the furnace.

The two arrangements are the mechanical equivalents of each other as respects the principle of the invention, and either may be adopted with same effect.

To illustrate this my invention I have shown it applied to a hot-air furnace or stove of a peculiar construction of my own, but I would here observe that it is applicable to any kind of furnace or stove in which it is an object to prevent the escape of smoke from the door of the stove when the door is opened for replenishing the fire or for other purposes.

To enable those skilled in the art to make and use my invention, I will proceed to describe its construction.

A is the shell around the fire-chamber, which has a door, B, in its front end and two vertical pipes, C C′, proceeding up from the top and near the front and rear ends. On top of these two pipes C C′ rests a horizontal drum, D, and from each side of the front end of this drum is a branch pipe, D′, each of which communicates with and helps to sustain the side drums, $D^2$.

E E are two branch pipes, which form communication with the pipe C′, or directly with the fire-chamber and side drum, $D^2$.

*b b′* are valves placed in the flues C C′. The valve *b′* in flue C′ is above the intersection of the pipes E E with the fire-chamber or flue C′, so that when the valves are closed the smoke, &c., will pass down through the pipes E E toward the front end of the furnace, through the side flues, and thence up through the pipes D′ D′, and back again through drum D to the chimney *c*; but when both valves are open there will be a direct communication between the fire-chamber and the horizontal drum D.

In starting the fire to obtain a sufficient draft it is desirable to have both flues C C′ open, and when the door of the stove is opened to put in fuel it is also desirable to have a direct draft both at the rear and in front of the fire-chamber. This draft is obtained by the auxiliary flue C, the valve *b′* of which is so connected to the valve *b′* of flue C′ that they can both be opened and closed at the same time.

To effect the opening and closing of the two valves at proper times I have connected them to the door B of the furnace by a rod, G, which is pivoted at one end to the bent arm *d* of the valve *b′*, and at the other end it is pivoted to a pin which projects up from one end of a pivoted slotted sector, H, in the slot of which an arm projecting from the door of the stove plays, so that the sector H is made to swing back and forth by the opening and closing of door B. The connecting-rod G is slotted in its front end as shown in Fig. 3, and this slot plays over the pin which projects from the sector arm so that the rod G, and consequently the valves *b b′*, will not be directly affected by the door in closing. Only in opening the door will the rod G be moved by it; but in order that the valves may be closed when the door is closed, a weighted arm, K, is attached to the crank-arm *d* of valve *b'*, as shown in Figs. 1 and 3, which arm rises and falls in opening and closing the door. The valves are thus opened by the door, but closed by the weight on arm K, when the door is closed. *e e*, Figs. 1 and 3, are rods, which stop the valves when they are open or when they are closed. The slot in connecting-rod G allows an end play to this rod sufficient to open the valves when the door of the furnace is closed. Therefore, when it is desirable to open the valves to increase combustion in the furnace it may be done by drawing the rod *b'* forward without opening the furnace-door. The weighted arm will close the valves again on releasing the rod G.

The two valves *b b'* are connected together by a rod, J, which is pivoted to the bent arms of the valves.

For the perfect distribution and utilization of the heat, I have found it advantageous to slightly retain the heated gases in the side radiators or drums, also to force them to pass under the flues or along the lower portion of the drum before issuing therefrom. This I have accomplished by the use of a partition-plate located in rear of the exit-pipe across the drum, and extending from the top of the drum to but little below the flue, so that the gases in their course from the pipes E will be forced to pass under this partition-plate, and consequently under the flue, before leaving the drum. By this arrangement the gases are checked or retained in the drum to some extent, whereby the drums are more intensely heated and caused to throw out more heat.

The arrangement shown in Fig. 2 has the merit of greater simplicity of construction. The valve or damper is weighted by means of an outside weight and oscillates on an axle extending to the outside of the flue or pipe, where it is bent or provided with a crank the end of which is connected with a valve-rod that passes through an aperture in the door-plate. At or just beyond the door-plate the rod is bent, forming a shoulder, which, abuts against the inner face of the door, or a projecting part thereof. The remainder of the rod forms the handle, whereby the valve may be worked by hand.

If the valve be properly adjusted in relation to the door—that is to say, so as to be on a bevel or closed sufficiently only to allow the requisite amount of draft, then, on opening the door, the valve, actuated by the weight, will assume a vertical position, and thus allow full draft to carry off the smoke. On closing the door it will bear against the shoulder of the rod, thereby lift the weight, and replace the valve in its normal position.

To regulate the draft during the operation of the furnace, it is only necessary to raise the rod sufficiently high to clear the door, when the valve may be operated independently of the door. It is obvious that there may be several shoulders or hooks to the rod to allow of the proper adjustment of the valve.

Having thus described my invention, what I claim as new, and desire to secure by Letters Patent, is—

1. In combination with both the main and the auxiliary chimney, arranged respectively in rear and front of the fire, coupled valves or dampers actuated by the furnace-door, or otherwise, in the manner and for the purposes set forth.

2. The herein-described tvalve arrangemen capable of being operated by the movement of the furnace-door as well as by hand, the same consisting of a weighted oscillating valve and a connecting-rod extending in front beyond but abutting at a shoulder or some projecting part thereof against the door, or against any fixture of the same, the whole being combined for operation substantially as herein shown and described.

3. The herein-described valve arrangement, capable of being operated by the movement of the furnace-door as well as by hand, the same consisting of a pivoted slotted sector forming connection between the door and a slotted valve-rod of a weighted valve or damper, the whole being arranged for operation substantially as herein shown and described.

In testimony whereof I have signed this specification in presence of two witnesses.

OSCAR PADDOCK.

Witnesses:
B. R. MEIGS,
L. PADDOCK.